United States Patent
Kim (10) Patent No.: US 8,737,783 B2
(45) Date of Patent: May 27, 2014

(54) LIGHT GUIDING PLATES AND LIGHT EMITTING DEVICES INCLUDING THE SAME

(75) Inventor: Yu-Sik Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 866 days.

(21) Appl. No.: 12/662,429

(22) Filed: Apr. 16, 2010

(65) Prior Publication Data
US 2010/0265737 A1    Oct. 21, 2010

(30) Foreign Application Priority Data

Apr. 17, 2009 (KR) .................. 10-2009-0033720

(51) Int. Cl.
*G02B 6/10* (2006.01)
(52) U.S. Cl.
USPC ............. 385/45; 385/129; 385/130; 385/31
(58) Field of Classification Search
USPC ................. 385/129–132, 15, 31, 45
See application file for complete search history.

(56) References Cited

U.S. PATENT DOCUMENTS

| | | | | |
|---|---|---|---|---|
| 4,781,424 A * | 11/1988 | Kawachi et al. | .............. | 385/132 |
| 7,218,830 B2 * | 5/2007 | Iimura | .............. | 385/146 |
| 7,221,845 B2 * | 5/2007 | Steenblik et al. | .............. | 385/131 |
| 7,356,235 B2 * | 4/2008 | Choi et al. | .............. | 385/129 |
| 7,532,800 B2 * | 5/2009 | Iimura | .............. | 385/146 |
| 2002/0154879 A1 * | 10/2002 | Yasuda et al. | .............. | 385/132 |
| 2003/0063456 A1 * | 4/2003 | Katahira | .............. | 362/27 |
| 2004/0042753 A1 * | 3/2004 | Steenblik et al. | .............. | 385/131 |
| 2006/0002675 A1 * | 1/2006 | Choi et al. | .............. | 385/129 |
| 2006/0056002 A1 * | 3/2006 | Wooten et al. | .............. | 359/245 |
| 2006/0098929 A1 * | 5/2006 | Steenblik et al. | .............. | 385/131 |
| 2007/0025121 A1 * | 2/2007 | Harada et al. | .............. | 362/607 |
| 2007/0177406 A1 * | 8/2007 | Kimura et al. | .............. | 362/616 |
| 2008/0019652 A1 * | 1/2008 | Steenblik et al. | .............. | 385/131 |
| 2008/0297696 A1 * | 12/2008 | Banerjee | .............. | 349/65 |

FOREIGN PATENT DOCUMENTS

| | | |
|---|---|---|
| JP | 2006-126731 | 5/2006 |
| KR | 10-0670819 | 1/2007 |
| KR | 10-2008-041495 | 5/2008 |

* cited by examiner

*Primary Examiner* — Charlie Peng
*Assistant Examiner* — Mary El Shammaa
(74) *Attorney, Agent, or Firm* — Harness, Dickey & Pierce, PLC

(57) ABSTRACT

A light guiding plate may include a substrate, a waveguide, and a reflective metal. The waveguide and the reflective metal may be formed on the substrate. The waveguide may guide light. The reflective metal may reflect the light guided along the waveguide to change a propagation direction of the light. A light guiding plate may include a substrate, a cladding layer, and a plurality of waveguides. The cladding layer may be formed on the substrate. The cladding layer may include a first insulating layer having a first refractive index. The plurality of waveguides may be formed on the cladding layer. The plurality of waveguides may include a second insulating layer having a second refractive index. The second refractive index may be higher than the first refractive index. The plurality of waveguides may guide light provided by a light emitting element. At least two of the waveguides may have different lengths.

17 Claims, 10 Drawing Sheets

LIGHT GUIDING PLATES AND LIGHT EMITTING DEVICES INCLUDING THE SAME

CROSS-REFERENCE TO RELATED APPLICATION(S)

This application claims priority from Korean Patent Application No. 10-2009-0033720, filed on Apr. 17, 2009, in the Korean Intellectual Property Office (KIPO), the entire contents of which are incorporated herein by reference.

BACKGROUND

1. Field

Example embodiments relate to light guiding plates. Example embodiments also may relate to light emitting devices that include the light guiding plates.

2. Description of the Related Art

In recent years, with trends toward lightweight, slim profile, and/or high performance, image displays have been used in a wide variety of application areas, such as TVs or monitors. Since a liquid crystal panel may not be a self-emission type display, a liquid crystal display (LCD) may require a light source, such as a backlight. A cold cathode fluorescent lamp (CCFL) may be used as the light source for the backlight. CCFLs recently may have been used as a light source for the backlight, owing to their low price and/or manageability. However, backlight units employing CCFLs may suffer from drawbacks, such as environmental pollution due to the CCFLs' use of mercury, slow response speed, and/or difficulty of partial driving. To overcome these drawbacks, light-emitting devices, such as light-emitting diodes (LEDs) and/or laser diodes (LDs), may have been proposed as a light source for backlight units instead of CCFLs. Backlight units using light-emitting devices may be environment-friendly and/or may achieve high color reproduction and/or partial driving, such as local dimming.

In general, backlight units using LEDs may be divided into edge-type backlight units (side illumination) and direct-type backlight units (direct illumination). In the case of the direct-type backlight units, a plane light source may be positioned at a lower part of a liquid crystal panel, and/or light may be directly irradiated to a front surface of the liquid crystal panel from the plane light source. The plane light source may have almost the same area as the liquid crystal panel. On the other hand, in the case of edge-type backlight units, a light emitting device may be positioned at the side of the liquid crystal panel and/or may emit light onto a front surface of the liquid crystal panel using a light guide panel.

In edge-type backlight units, however, the light generated from the side of the light emitting device may not spread uniformly across the entire liquid crystal panel. That is to say, the liquid crystal panel may have a portion (e.g., a central portion) that is located far away from the light emitting device and/or darker than the remaining portions.

SUMMARY

Example embodiments may provide light guiding plates capable of spreading light uniformly across a display area.

Example embodiments also may provide light emitting devices that include the light guiding plates.

These and other objects may be described in and/or be apparent from the following description of example embodiments.

According to example embodiments, there may be provided a light guiding plate that may include a waveguide on the substrate and/or that may guide light, and/or a reflective metal that may be on the substrate and/or that may reflect the light guided along the waveguide in order to change a propagation direction of the light.

According to example embodiments, there may be provided a light guiding plate that may include a substrate, a cladding layer on the substrate that may include a first insulating layer having a first refractive index, and/or a plurality of waveguides that may include a second insulating layer having a second refractive index. The second refractive index may be higher than the first refractive index. The plurality of waveguides may guide light provided by one light emitting element. At least two of the waveguides may have different lengths.

According to example embodiments, there may be provided a light emitting device that may include a light guiding plate and/or a light emitting element disposed at an edge of the light guiding plate. The light emitting element may generate light.

According to example embodiments, a light guiding plate may include a substrate; a waveguide, on the substrate, that may guide light; and/or a reflective metal, on the substrate, that may reflect the light guided along the waveguide to change a propagation direction of the light.

According to example embodiments, a light guiding plate may include a substrate; a cladding layer, on the substrate, that may include a first insulating layer having a first refractive index; and/or a plurality of waveguides, on the cladding layer, that may include a second insulating layer having a second refractive index. The second refractive index may be higher than the first refractive index. The plurality of waveguides may guide light provided by a light emitting element. At least two of the waveguides may have different lengths.

According to example embodiments, a light emitting device may include a light guiding plate and/or a light emitting element, at an edge of the light guiding plate, that may generate light.

BRIEF DESCRIPTION OF THE DRAWINGS

The above and/or other aspects and advantages will become more apparent and more readily appreciated from the following detailed description of example embodiments taken in conjunction with the accompanying drawings, in which.

DETAILED DESCRIPTION

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 1:
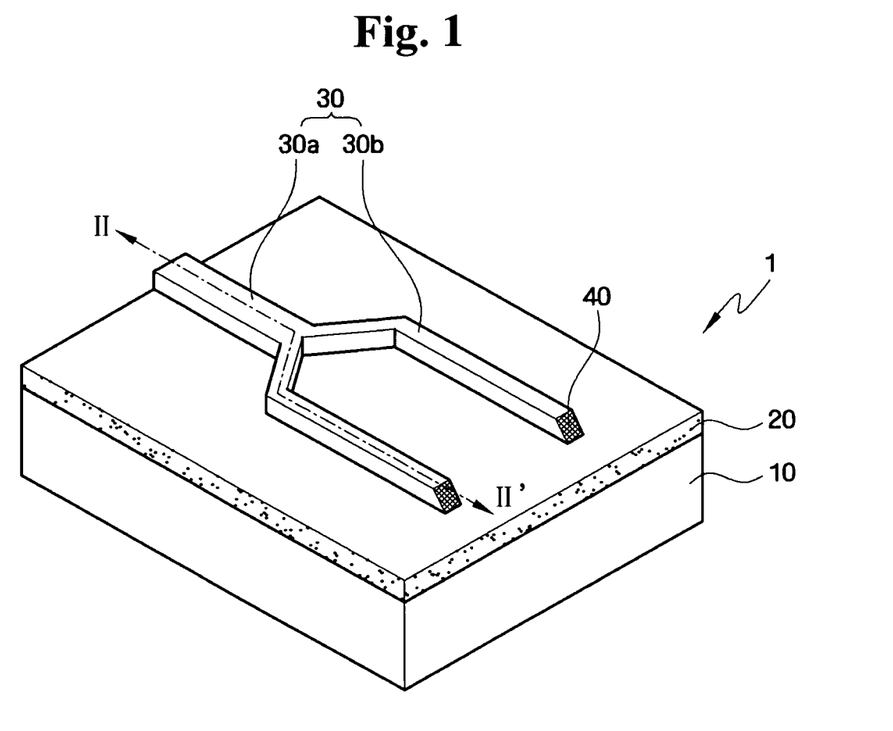
FIG. 1 is a perspective view of a light guiding plate according to example embodiments.
Figure 2:
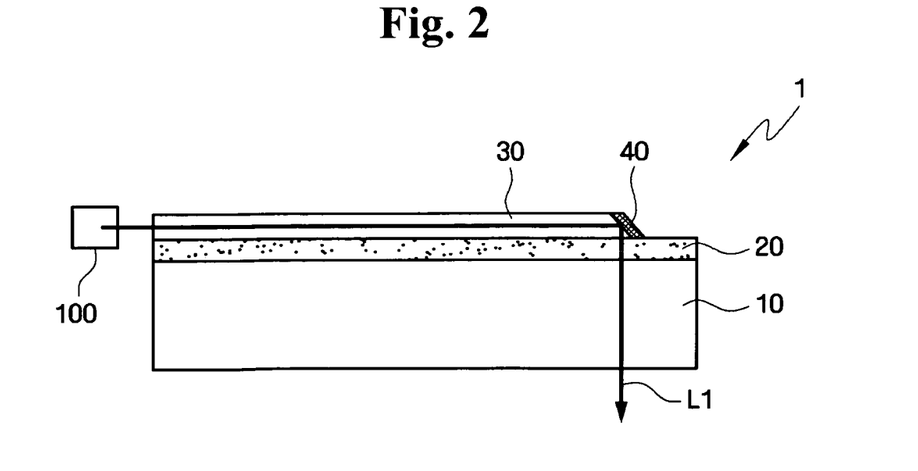
FIG. 2 is a cross-sectional view, taken along line II-II', of the light guiding plate of FIG. 1.
Figure 3:
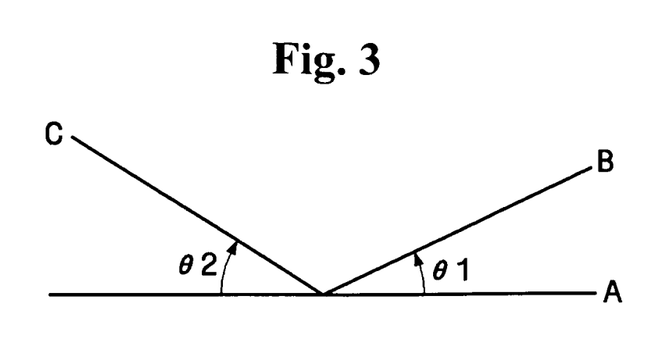
FIG. 3 illustrates an angle formed by a reflective metal shown in FIG. 1.

FIGS. 1 through 3 are drawings for explaining light guiding plate 1 according to example embodiments. More specifically, FIG. 1 is a perspective view of light guiding plate 1 according to example embodiments; FIG. 2 is a cross-sectional view, taken along line II-II', of light guiding plate 1 of FIG. 1; and FIG. 3 illustrates an angle formed by reflective metal 40 shown in FIG. 1.

Referring to FIGS. 1 and 2, light guiding plate 1 according to example embodiments may include substrate 10, cladding layer 20, waveguide 30, and/or reflective metal 40.

Substrate 10 may be a transparent substrate. Examples of the transparent substrate may include, but not limited to, a glass substrate.

Cladding layer 20 may be formed over substrate 10 and/or may include a first insulating layer having first refractive index $n_1$. Waveguide 30 may be disposed over cladding layer 20 and/or may include a second insulating layer having second refractive index $n_2$. In particular, second refractive index $n_2$ may be higher than first refractive index $n_1$. For example, cladding layer 20 may be made of silicon oxide having first refractive index $n_1$ of 1.45, while waveguide 30 may be made of silicon oxynitride having second refractive index $n_2$ of 1.5. However, example embodiments are not limited thereto. For example, silicon oxide and/or silicon nitride having a greater refractive index than cladding layer 20 may be used as waveguide 30.

Figure 6A:
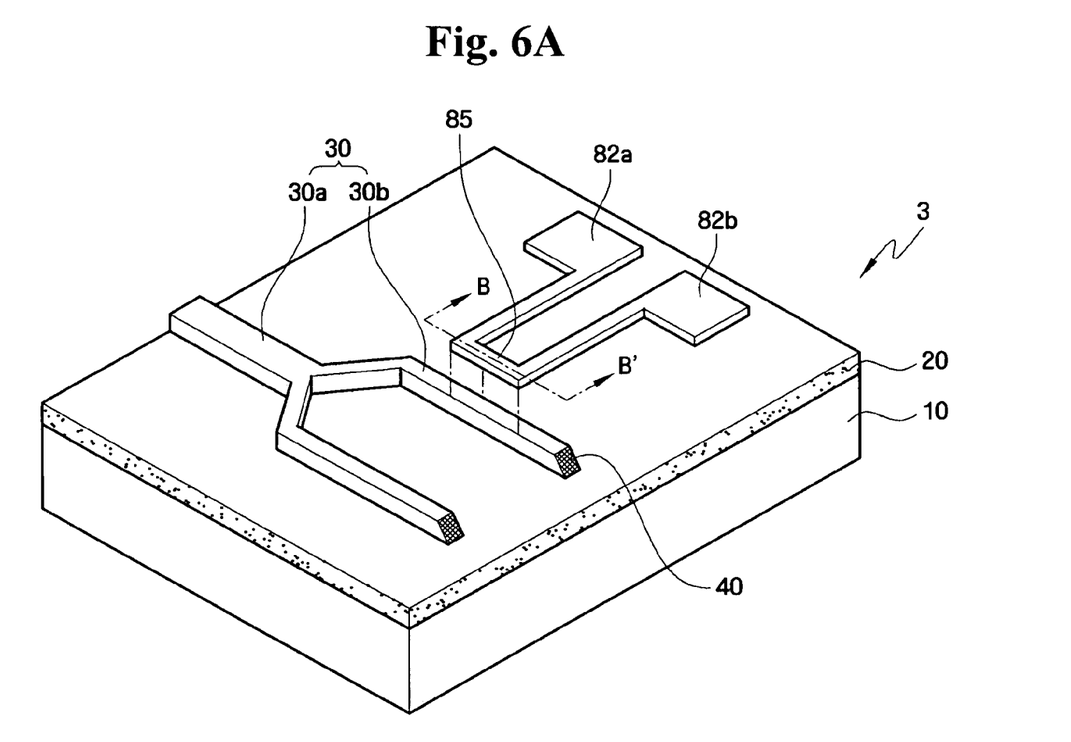
FIG. 6A is a perspective view of a light guiding plate according to example embodiments.
Figure 6B:
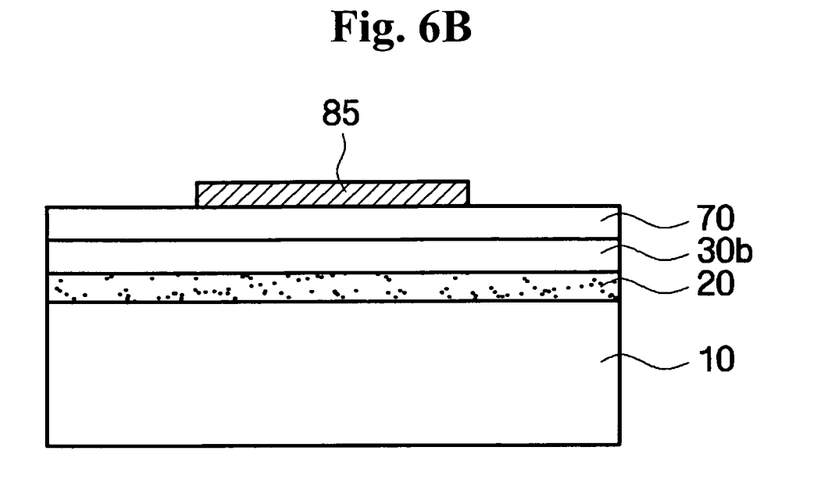
FIG. 6B is a cross-sectional view, taken along line B-B', of FIG. 6A.

Although not shown in FIG. 1, light guiding plate 1 further may include a separate cladding layer having, for example, first refractive index $n_1$ in order to enclose waveguide 30 and/or cladding layer 20, as shown in FIG. 6B.

Refractive index contrast Δ between first refractive index $n_1$ and second refractive index $n_2$ may be defined by Equation (1):

$$\Delta = [(n_2)^2 - (n_1)^2]/[2*(n_2)^2] \tag{1}$$

where $n_1$ may denote first refractive index $n_1$ of cladding layer 20 and/or $n_2$ may denote second refractive index $n_2$ of waveguide 30. Due to effects associated with refractive index contrast Δ, light may be guided through waveguide 30. As refractive index contrast Δ becomes larger, waveguide 30 may be made smaller, finer, and/or more efficient. For example, a conventional optical fiber may have a refractive index contrast Δ of about 0.3%. However, according to example embodiments, refractive index contrast Δ between first refractive index n1 of cladding layer 20 and second refractive index n2 of waveguide 30 may be greater than about 2%. As described above, if cladding layer 20 may be a silicon oxide layer having first refractive index $n_1$ of 1.45 and waveguide 30 may be a silicon oxynitride layer having second refractive index $n_2$ of 1.5, then refractive index contrast Δ may be about 3.28%.

Referring to FIG. 1, waveguide 30 may be divided into first area 30a and/or second area 30b. That is to say, a light beam propagating through first area 30a may be divided into two light beams that then may pass through two branches of second area 30b. For example, if the amount of light passing through first area 30a is 1, then the amount of light passing through one branch of second area 30b may be ½. In this way, waveguide 30 may allow incident light to be uniformly distributed according to its shape.

Reflective metal 40 may reflect light guided along waveguide 30 and/or may change the propagation direction of the light. Any material may be used as reflective metal 40, as long as it may be a highly reflective metal. Examples include silver (Ag) and/or aluminum (Al).

Referring to FIG. 2, light L1, provided by light emitting element 100, may be guided along waveguide 30, may be reflected by reflective metal 40, and/or may propagate toward substrate 10. Since substrate 10 may be a transparent substrate, light L1 may penetrate through substrate 10. In order to adjust the propagation direction of light L1 as described above, a distal end of waveguide 30 may form an acute angle with substrate 10 and/or reflective metal 40 may be disposed at the distal end of waveguide 30. That is to say, reflective metal 40 and substrate 10 may form an acute angle with respect to each other.

The angle between A and B refers to the smallest one of a plurality of angles between A and B. Referring to FIG. 3, the angle between A and B may be denoted by angle θ1 measured counter-clockwise from the surface of A to B. The angle between A and C may be denoted by angle θ2 measured clockwise from the surface of A to C.

In summary, light guiding plate 1 according to example embodiments may guide light to the desired position through waveguide 30 having high light guide efficiency. Light guiding plate 1 according to example embodiments also may change the propagation direction of light guided through reflective metal 40 at the desired position so that light may spread at the same position.

Further, a high refractive index contrast Δ between cladding layer 20 and waveguide 30 may allow fabrication of small and/or fine waveguide 30 and, thus, a thin light guiding plate 1.

Figure 4:
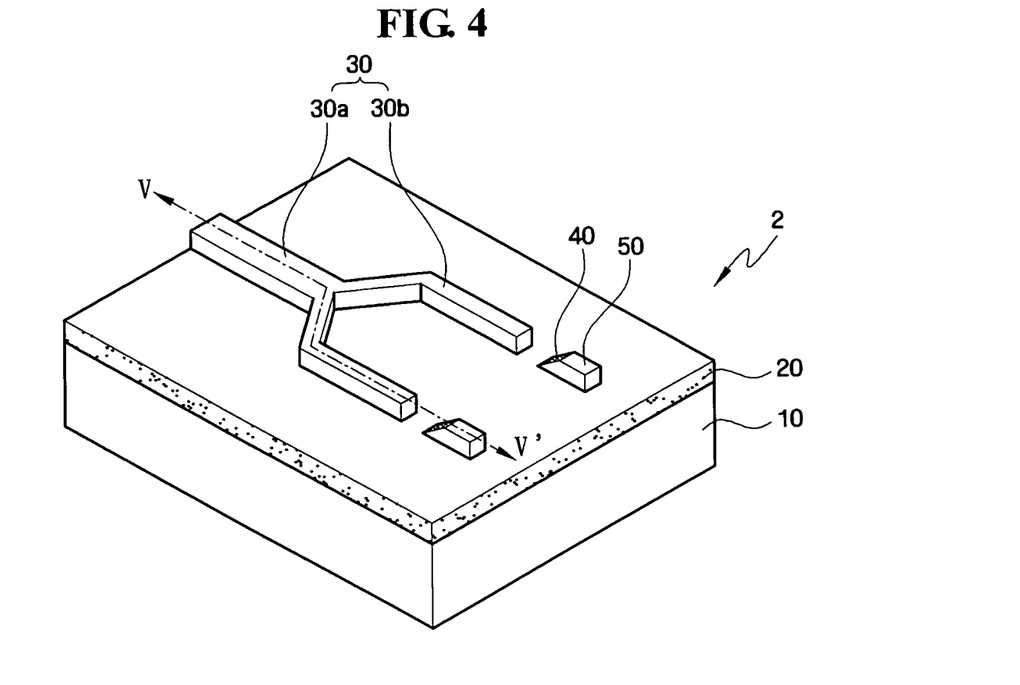
FIG. 4 is a perspective view of a light guiding plate according to example embodiments.
Figure 5:
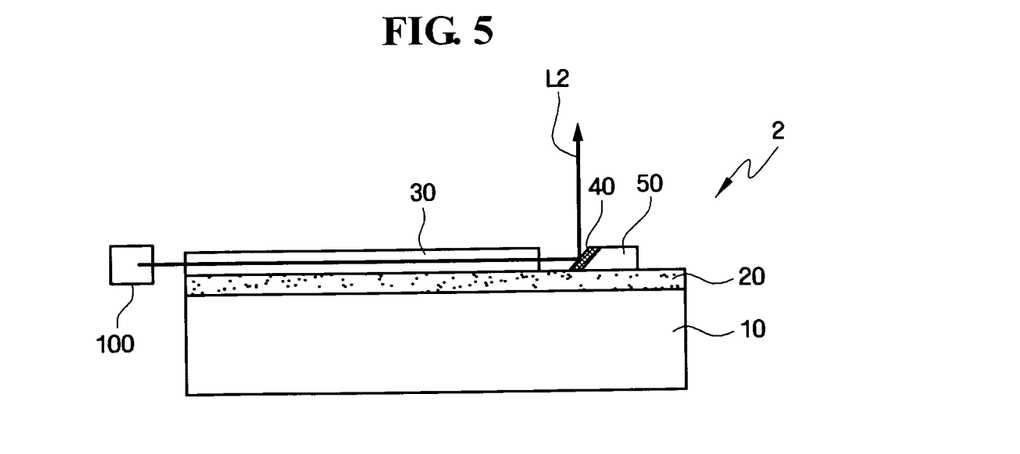
FIG. 5 is a cross-sectional view, taken along line V-V', of the light guiding plate of FIG. 4.

FIGS. 4 and 5 illustrate light guiding plate 2 according to example embodiments. More specifically, FIG. 4 is a perspective view of light guiding plate 2 according to example embodiments; and FIG. 5 is a cross-sectional view, taken along line V-V', of light guiding plate 2 of FIG. 4. Referring to FIGS. 4 and 5, substrate 10 of light guiding plate 2 may be an opaque substrate. Examples of the opaque substrate may include, but are not limited to, silicon (Si), strained Si, Si alloy, SOI (Silicon-On-Insulator), SiC (where C stands for carbon), SiGe (where Ge stands for germanium), SiGeC, Ge, Ge alloy, GaAs (where As stands for Arsenic), InAs (where In stands for indium), AlN (where N stands for nitrogen), Cs (where Cs stands for Cesium), one or more polyimides, one or more composites of these materials, and/or stacks thereof.

Referring to FIG. 5, light L2 provided by light emitting element 100 may be guided along waveguide 30, may be reflected by reflective metal 40, and/or may propagate in a direction away from substrate 10.

To adjust the propagation direction of light L2 as described above, light guiding plate 2 may have the following construction.

Support layer 50 may be spaced apart from and/or may have a distal end opposite to a distal end of waveguide 30. The distal end of support layer 50 may form an acute angle with substrate 10. Reflective metal 40 may be formed on the distal end of support layer 50. Support layer 50 may be made, for example, of the same material as waveguide 30 and/or may be disposed in a same plane as waveguide 30. For example, support layer 50 may be formed simultaneously with waveguide 30.

Although it has been described above that substrate 10 may be an opaque substrate, it also may be a transparent substrate.

That is to say, when substrate 10 is transparent, it also may be possible to make light L2 propagate in a direction away from substrate 10.

FIG. 6A is a perspective view of light guiding plate 3 according to example embodiments; and FIG. 6B is a cross-sectional view, taken along line B-B', of FIG. 6A. For convenience of illustration, cladding layer 70 is not shown in FIG. 6A.

Referring to FIGS. 6A and 6B, unlike light guiding plate 1, light guiding plate 3 according to example embodiments may include separate cladding layer 70 and/or refractive index modifying layer 85. If light guiding plate 3 includes separate cladding layer 70 and refractive index modifying layer 85, they may be sequentially formed on cladding layer 20 having waveguide 30 situated thereon.

Cladding layer 70 may be formed so as to enclose underlying waveguide 30 and/or cladding layer 20. Cladding layer 70 may have substantially a same refractive index as first refractive index $n_1$ of cladding layer 20.

Refractive index modifying layer 85 may be formed on cladding layer 70 so as to overlap at least a portion of waveguide 30. Refractive index modifying layer 85 may be made of metal. Examples metals include aluminum (Al), copper (Cu), and so on.

Upon application of a control bias to refractive index modifying layer 85, the refractive index of waveguide 30 may change in such a manner as to adjust the amount of light guided along waveguide 30. For example, no light may be guided through waveguide 30. In example embodiments (e.g., as shown in FIG. 6A), it may be possible to adjust the amount of light being guided through upper second area 30b, but not the amount of light being guided through lower first area 30a.

Pads 82a and/or 82b may be electrically connected to refractive index modifying layer 85. A control bias may be applied to refractive index modifying layer 85 via pads 82a and/or 82b. Although not shown in FIGS. 4 and 5, light guiding plate 2 may further include refractive index modifying layer 85.

Figure 7:
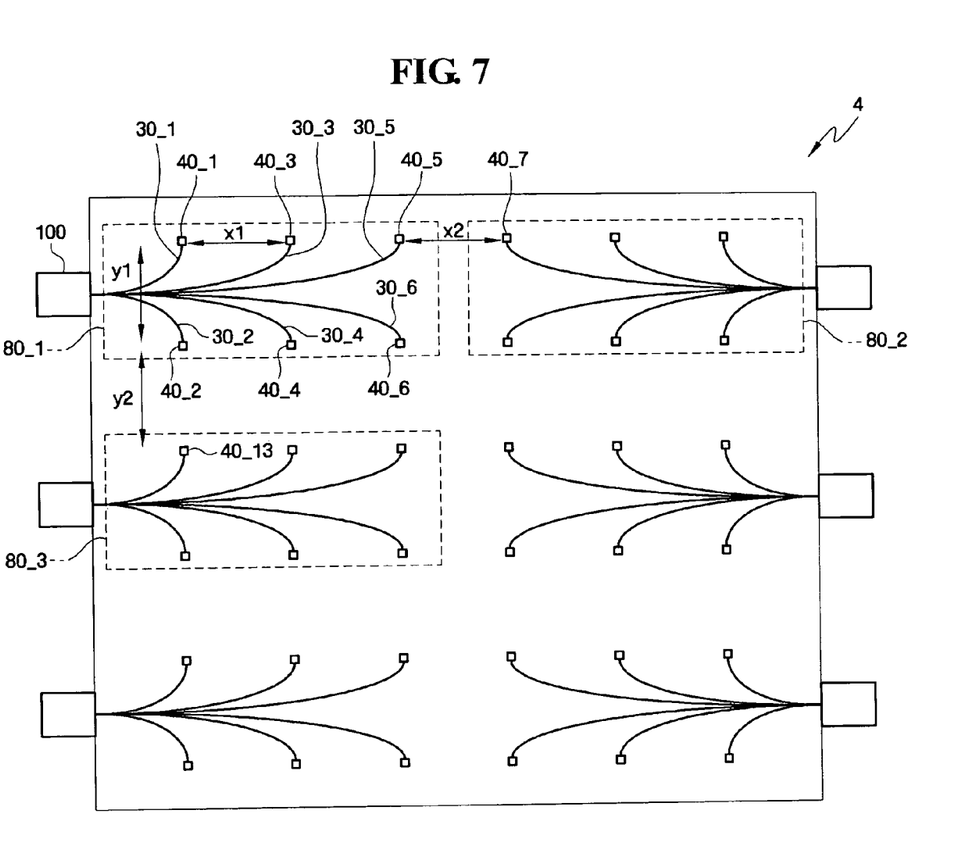
FIG. 7 is a plan view for explaining a light guiding plate according to example embodiments.
Figure 8:
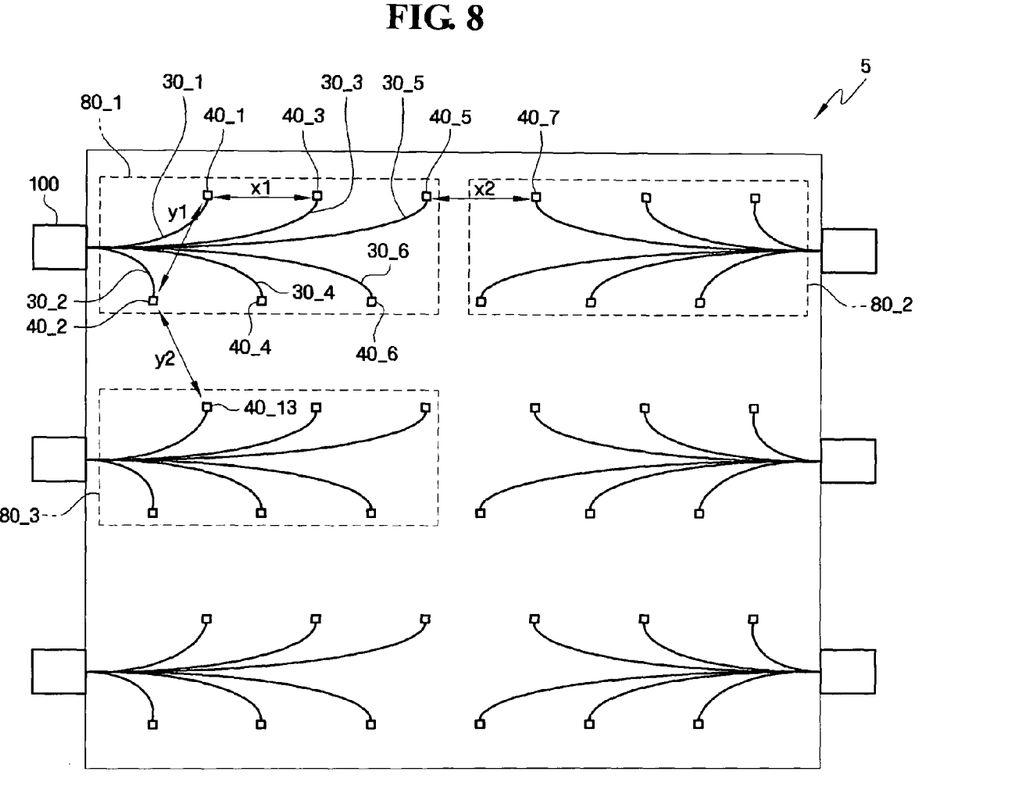
FIG. 8 is a plan view for explaining a light guiding plate according to example embodiments.

FIGS. 7 and 8 are plan views for explaining light guiding plates according to example embodiments, in which, for convenience of explanation, waveguides 30 and reflective metals 40 are illustrated.

Referring to FIG. 7, light guiding plate 4 according to example embodiments may include plurality of waveguides 30_1 through 30_6 for light emitting element 100, and/or plurality of reflective metals 40_1 through 40_6 corresponding one-to-one with plurality of waveguides 30_1 through 30_6. Plurality of waveguides 30_1 through 30_6 and/or plurality of reflective metals 40_1 through 40_6 corresponding to light emitting element 100 may be defined as one group 80_1. Applicant notes that example embodiments may include any number of waveguides and/or reflective metals in a group. Applicant also notes that example embodiments may include any number of waveguides and/or reflective metals in a row or column. Additionally, Applicant notes that waveguides and/or reflective metals do not need to be disposed in one or more rows and/or one or more columns.

That is to say, each of plurality of waveguides 30_1 through 30_6 may guide light generated by light emitting element 100. The light guided by each of plurality of waveguides 30_1 through 30_6 may then be reflected by a corresponding one of plurality of reflective metals 40_1 through 40_6.

Plurality of reflective metals 40_1 through 40_6 and other reflective metals 40_7 and 40_13 may be substantially equally spaced apart from one another on substrate 10. For example, distance x1 between transversely spaced-apart reflective metals 40_1 and 40_3 may be equal to distance y1 between longitudinally spaced-apart reflective metals 40_1 and 40_2.

Distance x1 also may be equal to distance x2 between reflective metal 40_5 in group 80_1 and reflective metal 40_7 in group 80_2. Distance y1 may be equal to a distance y2 between reflective metal 40_2 in group 80_1 and reflective metal 40_13 in group 80_3.

When plurality of reflective metals 40_1 through 40_6, 40_7, and 40_13 may be arranged at regular intervals as described above, light may be reflected thereby so as to spread uniformly over an entire liquid crystal panel.

In example embodiments, distances x1, x2, y1, and/or y2 may be adjusted to be different from one another, as needed.

Meanwhile, since plurality of reflective metals 40_1 through 40_6 may receive light from light emitting element 100 and/or may be disposed at regular intervals, at least two of plurality of waveguides 30_1 through 30_6 corresponding to light emitting element 100 may have different lengths. For example, waveguide 30_3 may be longer than waveguide 30_1, but shorter than waveguide 30_5, while waveguide 30_1 may be as long as waveguide 30_2.

Referring to FIG. 8, unlike light guiding plate 4, light guiding plate 5 according to example embodiments may include plurality of waveguides 30_1 through 30_6 having different lengths for one light emitting element 100. For example, waveguide 30_1 may be longer than waveguide 30_2, but shorter than waveguide 30_3. As discussed above regarding FIG. 7, Applicant notes that example embodiments may include any number of waveguides and/or reflective metals in a group. Applicant also notes that example embodiments may include any number of waveguides and/or reflective metals in a row or column. Additionally, Applicant notes that waveguides and/or reflective metals do not need to be disposed in one or more rows and/or one or more columns.

Similar to light guiding plate 4, light guiding plate 5 according to example embodiments may include plurality of reflective metals 40_1 through 40_6, 40_7, and 40_13 that may be substantially equally spaced apart from one another on substrate 10. For example, distance x1 between the transversely spaced-apart reflective metals 40_1 and 40_3 may be equal to distance y1 between longitudinally spaced-apart reflective metals 40_1 and 40_2.

Distance x1 may also be equal to distance x2 between reflective metal 40_5 in group 80_1 and reflective metal 40_7 in group 80_2. Distance y1 may be equal to distance y2 between reflective metal 40_2 in group 80_1 and reflective metal 40_13 in group 80_3.

In example embodiments, distances x1, x2, y1, and/or y2 may be adjusted to be different from one another, as needed.

Figure 9:
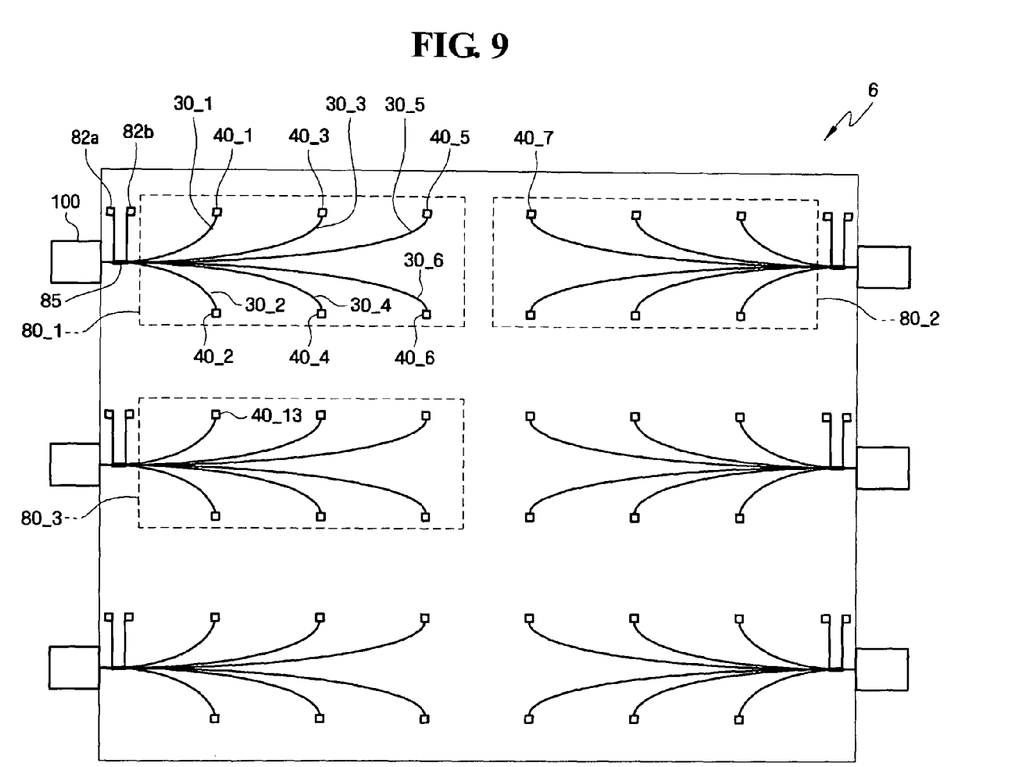
FIG. 9 is a plan view of a light guiding plate according to example embodiments.

FIG. 9 is a plan view of light guiding plate 6 according to example embodiments.

Referring to FIG. 9, light guiding plate 6 according to example embodiments further may include refractive index modifying layers 85 described above with reference to FIGS. 6A and 6B. As discussed above regarding FIGS. 7 and 8, Applicant notes that example embodiments may include any number of waveguides and/or reflective metals in a group. Applicant also notes that example embodiments may include any number of waveguides and/or reflective metals in a row or column. Additionally, Applicant notes that waveguides and/or reflective metals do not need to be disposed in one or more rows and/or one or more columns.

As illustrated in FIG. 9, refractive index modifying layer 85 may be provided for each of groups 80_1 through 80_3. For example, refractive index modifying layer 85 may be formed on a region at which plurality of waveguides 30_1 through 30_6 may be clustered together. In this case, it may be possible to adjust light guided by waveguides 30_1 through 30_6 using refractive index modifying layer 85.

It also may be possible to perform a local dimming operation using refractive index modifying layer 85. For example, light guiding plate 5 may be configured such that group 80_1 guides light, while groups 80_2 and 80_3 do not guide light, according to the application. Conversely, groups 80_2 and 80_3 may guide light, while group 80_1 may not guide light.

Although FIG. 9 shows that light refractive index modifying layer 85 may adjust light guided by waveguides 30_1 through 30_6, example embodiments are not limited thereto. For example, refractive index modifying layer 85 may be provided for each of plurality of waveguides 30_1 through 30_6 in order to adjust light guided thereby.

Hereinafter, light emitting devices using light guiding plates according to example embodiments will be described in detail with reference to FIGS. 10 and 11.

Figure 10:
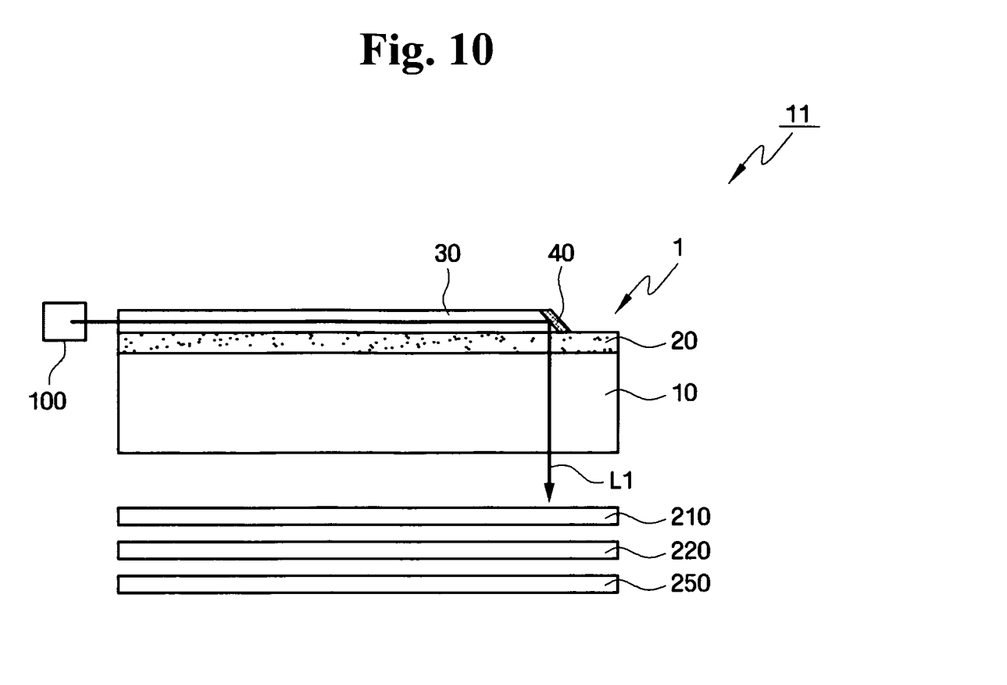
FIG. 10 illustrates a light emitting device that includes the light guiding plate shown in FIG. 2.
Figure 11:
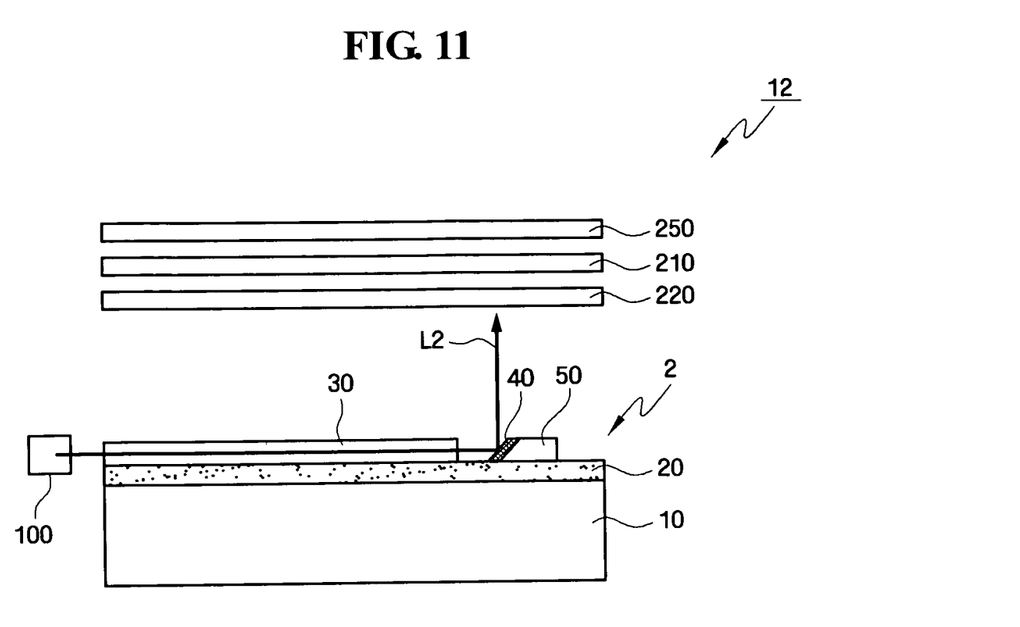
FIG. 11 illustrates a light emitting device that includes the light guiding plate shown in FIG. 5.

FIGS. 10 and 11 illustrate light emitting devices using the light guiding plates according to example embodiments. FIG. 10 illustrates a light emitting device including light guiding plate 1 shown in FIG. 2; and FIG. 11 illustrates a light emitting device including light guiding plate 2 shown in FIG. 5. Light emitting devices 11 and 12 of FIGS. 10 and 11 may be edge-type backlight units (BLUs) for use in a liquid crystal display (LCD).

Referring to FIG. 10, light emitting device 11 may include light emitting element 100, light guiding plate 1, diffusion sheet 210, phosphor layer 220, and/or liquid crystal panel 250.

Light emitting element 100 may provide light L1. Light guiding plate 1 may guide light L1 to liquid crystal panel 250. As described above, light guiding plate 1 may include waveguide 30, guiding light L1, and/or reflective metal 40, reflecting light L1, guided along waveguide 30 so as to change the propagation direction of light L1. This configuration may make it possible to uniformly spread out light L1.

Diffusion sheet 210 may disperse light exiting light guiding plate 1, thereby preventing a partial concentration of light. Phosphor layer 220 may be disposed below diffusion sheet 210. Phosphor layer 220 may absorb light emitted from light emitting element 100 and/or transform it into different wavelength light. That is to say, phosphor layer 220 may absorb primary light emitted from light emitting element 100 and/or may emit secondary light.

Use of the phosphor allows a light emitting device to represent various colors. For white color rendering, the following method may be used. If light emitting device element 100 emits light with a blue wavelength (in this case, light emitting device element 100 may be referred to as a blue emitting light emitting device), phosphor layer 220 may include a yellow phosphor that converts the wavelength of some of the blue light and/or that generates yellow light, and/or a red phosphor that converts the wavelength of some of the blue light and/or that generates red light. Alternatively, phosphor layer 220 also may include a green phosphor that converts the wavelength of some of the blue light and/or that generates green light, and/or a red phosphor that converts the wavelength of some of the blue light and/or that generates red light. In other words, when light emitting device element 100 may be a blue LED, white light may be produced by mixing the light generated based on the primary emission by light emitting device element 100 and the light based on the secondary emission by the phosphors.

Alternatively, if light emitting element 100 emits light with an ultraviolet (UV) wavelength (in this case, light emitting element 100 may be referred to as a UV LED), phosphor layer 220 may include red (R), green (G), and/or blue (B) phosphors.

For example, the phosphors may be one or more of a nitride-based/oxynitride-based phosphor, mainly activated by lanthanoids such as Eu (where Eu stands for europium) and Ce (where Ce stands for cerium); an alkaline earth halogen apatite phosphor, an alkaline earth metal borate halogen phosphor, an alkaline earth metal aluminate phosphor, an alkaline earth silicate phosphor, an alkaline earth sulfide phosphor, an alkaline earth thiogallate phosphor, a thiosilicate phosphor, an alkaline earth silicon nitride phosphor, a germinate phosphor, and a rare earth aluminate phosphor, mainly activated by lanthanoids such as Ce; a rare earth silicate phosphor, an organic material or organic complex, mainly activated by lanthanoids such as Ce.

Although phosphor layer 220 may be disposed between diffusion sheet 210 and liquid crystal panel 250 in example embodiments, it also may be disposed between diffusion sheet 210 and light guiding plate 1.

Alternatively, phosphor layer 220 underlying or overlying diffusion sheet 210 may not be formed. For example, if light emitting element 100 may have a phosphor layer therein to produce white light, then phosphor layer 220 need not be formed above or below diffusion sheet 210.

Referring to FIG. 11, since light emitting device 12 according to example embodiments may be configured such that light L2 is reflected by reflective metal 40 in a direction away from substrate 10, diffusion sheet 210, phosphor layer 220, and liquid crystal panel 250 may be disposed above substrate 10.

Although phosphor layer 220 may be disposed between diffusion sheet 210 and light guiding plate 2 in example embodiments, it also may be disposed between diffusion sheet 210 and liquid crystal panel 250.

Alternatively, phosphor layer 220 underlying or overlying diffusion sheet 210 may not be formed. For example, if light emitting element 100 may have a phosphor layer therein to produce white light, then phosphor layer 220 need not be formed above or below diffusion sheet 210.

While example embodiments have been particularly shown and described, it will be understood by those of ordinary skill in the art that various changes in form and details may be made therein without departing from the spirit and scope of the present invention as defined by the following claims.

What is claimed is:
1. A light guiding plate, comprising:
a substrate;
a cladding layer on the substrate;
a waveguide, on the cladding layer, configured to guide light;
a reflective metal, on the cladding layer, configured to reflect the light guided along the waveguide to change a propagation direction of the light; and
a refractive index modifying layer, formed on the waveguide, so as to overlap at least a portion of the waveguide;
wherein the refractive index modifying layer adjusts an amount of the light guided along the waveguide upon application of a control bias to the refractive index modifying layer,
wherein the cladding layer includes a first insulating layer having a first refractive index, and
wherein the waveguide includes a second insulating layer having a second refractive index.

2. The light guiding plate of claim 1, wherein a surface of the reflective metal forms an acute angle with a surface of the substrate.

3. The light guiding plate of claim 1, wherein the second refractive index is higher than the first refractive index.

4. The light guiding plate of claim 1, wherein the substrate is a transparent substrate.

5. The light guiding plate of claim 4, wherein the reflective metal changes the propagation direction of the light such that the light reflected by the reflective metal propagates toward the substrate.

6. The light guiding plate of claim 1, wherein a distal end of the waveguide forms an acute angle with the substrate, and
wherein the reflective metal is disposed at the distal end of the waveguide.

7. The light guiding plate of claim 1, wherein the substrate is an opaque substrate, and
wherein the reflective metal changes the propagation direction of the light such that the light reflected by the reflective metal propagates away from the substrate.

8. The light guiding plate of claim 6, further comprising:
a support layer;
wherein the support layer is spaced apart from the distal end of the waveguide on the cladding layer,
wherein a distal end of the support layer is disposed opposite to the distal end of the waveguide,
wherein the distal end of the support layer forms an acute angle with the substrate, and
wherein the reflective metal is on the distal end of the support layer.

9. A light guiding plate, comprising:
a substrate;
a waveguide, on the substrate, configured to guide light;
a reflective metal, on the substrate, configured to reflect the light guided along the waveguide to change a propagation direction of the light; and
a refractive index modifying layer, formed on the waveguide, so as to overlap at least a portion of the waveguide;
wherein the refractive index modifying layer adjusts an amount of the light guided along the waveguide upon application of a control bias to the refractive index modifying layer,
wherein a plurality of waveguides are configured to guide light provided by one light emitting element,
wherein a plurality of reflective metals are configured to reflect the light guided along the plurality of waveguides to change propagation directions of the light, and
wherein the plurality of reflective metals correspond one-to-one to the plurality of waveguides.

10. The light guiding plate of claim 9, wherein at least two of the waveguides have different lengths.

11. The light guiding plate of claim 9, wherein a distance between a first pair of the plurality of reflective metals is equal to a distance between a second pair of the plurality of reflective metals.

12. A light guiding plate, comprising:
a substrate;
a cladding layer, on the substrate, that includes a first insulating layer having a first refractive index;
a plurality of waveguides, on the cladding layer, that each include a second insulating layer having a second refractive index; and
a plurality of reflective metals configured to reflect light guided by the plurality of waveguides to change propagation directions of the light;

wherein the second refractive index is higher than the first refractive index,
wherein the plurality of waveguides is configured to guide the light provided by a light emitting element,
wherein at least two of the waveguides have different lengths,
wherein the plurality of reflective metals correspond one-to-one with the plurality of waveguides,
wherein a surface of each of the plurality of reflective metals forms an acute angle with a surface of the substrate, and
wherein a distance between a first pair of the plurality of reflective metals is equal to a distance between a second pair of the plurality of reflective metals.

13. A light emitting device, comprising:
the light guiding plate of claim 1; and
a light emitting element, at an edge of the light guiding plate, configured to generate light.

14. The light emitting device of claim 13, further comprising:
a phosphor layer; and
a liquid crystal panel;
wherein the phosphor layer is between the light guiding plate and the liquid crystal panel.

15. The light emitting device of claim 14, further comprising:
a diffusion sheet;
wherein the diffusion sheet is between the liquid crystal panel and the light guiding plate.

16. The light emitting device of claim 15, wherein the phosphor layer is between the diffusion sheet and the liquid crystal panel.

17. The light emitting device of claim 15, wherein the phosphor layer is between the diffusion sheet and the light guiding plate.

* * * * *